(No Model.)

M. DAESCH.
COOKING UTENSIL.

No. 590,212.   Patented Sept. 21, 1897.

Witnesses
Arthur Ashley
Victor J. Evans

Inventor
Minnie Daesch
By John Wedderburn.
Attorney

UNITED STATES PATENT OFFICE.

MINNIE DAESCH, OF BELLEVILLE, ILLINOIS.

COOKING UTENSIL.

SPECIFICATION forming part of Letters Patent No. 590,212, dated September 21, 1897.

Application filed April 24, 1897. Serial No. 633,637. (No model.)

*To all whom it may concern:*

Be it known that I, MINNIE DAESCH, a citizen of the United States, residing at Belleville, in the county of St. Clair and State of Illinois, have invented certain new and useful Improvements in Cooking Utensils; and I do hereby declare the following to be a full, clear, and exact description of the invention, such as will enable others skilled in the art to which it appertains to make and use the same.

This invention relates to cooking utensils; and it consists, essentially, of an inner and outer vessel, the inner vessel being divided by a removable section, forming a separate device, wherein a different article of food can be cooked simultaneously with another article of food in the inner vessel without destroying or affecting either.

The invention further consists in the details of construction and arrangement, which will be more fully hereinafter described and claimed.

The object of the invention is to provide a cooking utensil wherein different articles of food may be placed without imparting the flavor of one to the other and conveniently hasten the desired operation by means which are simple and effective in their construction and operation, strong and durable, and comparatively inexpensive in the cost of manufacture.

Figure 1:
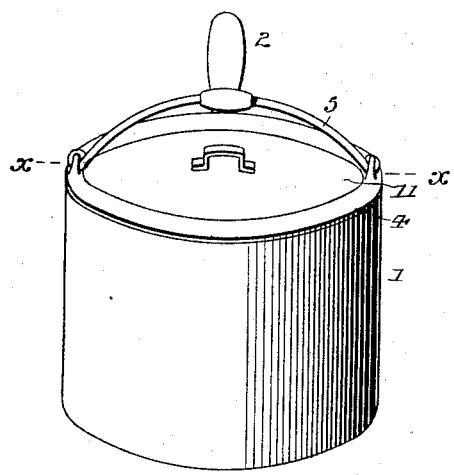
Figure 2:
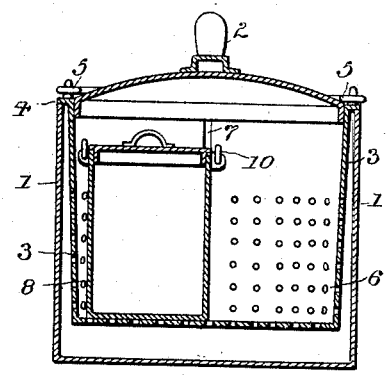
Figure 3:
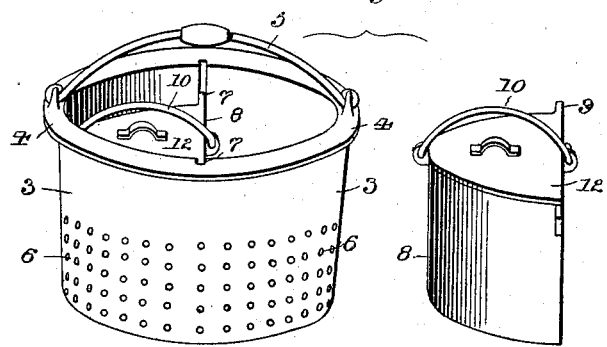
Figure 4:
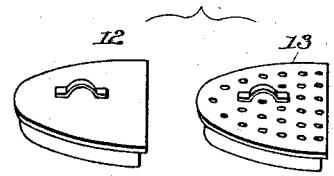

In the accompanying drawings, Figure 1 is a perspective view of the cooking utensil embodying the invention. Fig. 2 is a transverse vertical section on the line *x x*, Fig. 1. Fig. 3 is a detail perspective view of the inner vessel and the removable supplemental vessel therefor. Fig. 4 is a detail perspective view of different forms of covers adapted to be used with the supplemental vessel.

Referring to the drawings, wherein similar numerals of reference are employed to indicate corresponding parts in the several views, the numeral 1 designates an outer containing-vessel having a suitable handle 2, adapted to receive a preferred form of lid or cover. Within the said outer vessel 1 an inner vessel 3 is removably mounted and has an upper lip or flange 4 to rest on the upper edge of the said outer vessel 1, and also a lifting-bail or analogous device 5. The said inner vessel is foraminate in its lower portion, as at 6, and has vertically-disposed slots 7, extending from the bottom to the top thereof on opposite sides, and may be constructed of any preferred form or material, either wire-gauze or sheet metal, without departing from the scope of the invention. Within the inner vessel 3 a supplemental vessel 8 is removably mounted and has a semicircular body, whose opposite angular edges 9 removably fit in the slots 7. The curved side of the said supplemental vessel does not touch the adjacent curved side of the inner vessel 3, but the bottoms of each contact, a bail 10 being attached to the upper portion of the said supplemental vessel, whereby it can be placed in position in the vessels or removed therefrom. A lid or cover 11 is removably fitted in the top of the inner vessel 3, and, as shown by Fig. 4, a closed lid 12 or a foraminate lid 13 is intended to be removably placed in the top of the supplemental vessel and adapt it for use in ordinary boiling or a steaming operation.

In the use of the utensil, as set forth, water is placed in the outer vessel 1 and the inner vessel 3 is mounted therein, with the flange or lip 4 resting on the top edge thereof. The supplemental vessel 8 is then mounted in the inner vessel, and the different articles to be cooked in the inner vessel and the supplemental vessel are then deposited and the lid 12 or 13 placed over the supplemental vessel and the lid 11 in the upper portion of the inner vessel. By this means different articles of food can be cooked at one time in the utensil without the one being contaminated by the other, and either a boiling or a steaming action attained.

The utensil is especially useful in cooking vegetables, eggs, puddings, or anything that requires the water to be strained or drained after the cooking operation has terminated. To prevent burning of the articles contained within the inner vessel 3, the latter is made shallower than the outer vessel 1. The water in the outer vessel 1 circulates through the lower portion of the inner vessel 3 and up around the supplemental vessel 8 in view of its reduced extent and location in the said inner vessel.

The device, as an entirety, is simple and effective in its operation, and it is obviously apparent that many minor changes in the details of construction might be made and substituted for those shown and described without in the least departing from the nature or spirit of the invention.

Having thus described the invention, what is claimed as new is—

In a cooking utensil, the combination of an outer vessel, an inner vessel having a foraminate portion and slots in the opposite sides thereof, and a supplemental semicircular vessel removably mounted in the inner vessel and having its angular edges engaging the slots thereof, substantially as and for the purposes specified.

In testimony whereof I have signed this specification in the presence of two subscribing witnesses.

MINNIE DAESCH.

Witnesses:
FRED G. WEHRLE,
MEANA SCHRUNTH.